United States Patent
Mayumi

(10) Patent No.: US 6,707,196 B2
(45) Date of Patent: Mar. 16, 2004

(54) MOTOR WITH IMPROVED MOTOR CASING

(75) Inventor: Eiji Mayumi, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 10/068,781

(22) Filed: Feb. 5, 2002

(65) Prior Publication Data

US 2002/0140303 A1 Oct. 3, 2002

(30) Foreign Application Priority Data

Feb. 14, 2001 (JP) ........................................ 2001-036823

(51) Int. Cl.[7] .............................. H02K 5/02; H02K 5/06
(52) U.S. Cl. ...................... 310/89; 310/49 R; 310/257; 310/49 A
(58) Field of Search ................................ 310/89, 49 R, 310/257, 42, 41, 51

(56) References Cited

U.S. PATENT DOCUMENTS

| | | | |
|---|---|---|---|
| 3,555,320 A | 1/1971 | Johnson | 310/89 |
| 3,691,414 A | 9/1972 | Kappius et al. | 310/49 R |
| 4,340,830 A | 7/1982 | Hoyer-Ellefsen | 310/89 |
| 4,825,112 A | 4/1989 | Mineyama | 310/71 |
| 5,004,941 A | 4/1991 | Ohzeki et al. | 310/49 R |
| 5,043,613 A | 8/1991 | Kurata et al. | 310/49 R |
| 5,121,017 A | 6/1992 | Yamamoto et al. | 310/49 R |
| 5,170,082 A | 12/1992 | Nakagawa et al. | 310/45 |
| 5,187,400 A | 2/1993 | Kurata | 310/49 R |
| 5,298,820 A | 3/1994 | Lee et al. | 310/40 MM |
| 5,399,929 A * | 3/1995 | Okada et al. | 310/154.18 |
| 5,412,267 A * | 5/1995 | Okada et al. | 310/42 |
| 5,925,950 A * | 7/1999 | Lau | 310/68 B |
| 6,222,286 B1 | 4/2001 | Watanabe et al. | 310/49 R |
| 6,320,294 B1 | 11/2001 | Kliman | 310/257 |
| 2002/0005670 A1 | 1/2002 | Takagi et al. | 310/49 R |

FOREIGN PATENT DOCUMENTS

| | | | |
|---|---|---|---|
| JP | 11-089207 | 3/1999 | |
| JP | 11089207 | 3/1999 | H02K/37/14 |

* cited by examiner

*Primary Examiner*—Dang Le
*Assistant Examiner*—H. Y. Elkassabgi
(74) *Attorney, Agent, or Firm*—Hogan & Hartson, LLP

(57) ABSTRACT

A motor includes a rotor equipped with a magnet magnetized in multiple poles, a stator yoke having claw poles with plural pole teeth disposed opposing to one another and arranged in a cylindrical shape extending in an axial direction and around an outer periphery of the rotor in a circumferential direction, a bobbin formed from a coil wound around the stator yoke, and a cylindrical motor case that houses the rotor, the stator yoke and the bobbin. The cylindrical motor case is formed from conductive material and uses as at least a part of the yoke. The motor case defines generally parallel planes tangential to an outer periphery of the coil, and has side wall sections extending in close proximity to the parallel planes and defining plane opening sections, and a part of an outer peripheral surface of the coil of the bobbin protrudes from the opening sections.

13 Claims, 4 Drawing Sheets

MOTOR WITH IMPROVED MOTOR CASING

BACKGROUND OF THE INVENTION

1. Field of the Invention

The present invention relates to stepping motors, and more particularly to structures of stepping motors and synchronous motors that may be mounted in closed narrow space in various office automation (OA) equipment, audio visual (AV) equipment, robots and cameras, and applied to automatic control systems for positioning, focusing and other operations

2. Description of Related Art

A stepping motor is generally composed of a rotor section, and a stator section including a case, coils, a bearing section and a terminal section. A body diameter of the stepping motor (hereafter referred to as a "motor width") perpendicular to a rotor shaft is determined by the outer diameter of the case. However, since the motor width is determined by the outer diameter of the case, an available maximum outer diameter of the coils is given by subtracting a plate thickness of the case and an insulation gap between the coils and the case from the outer diameter of the case. Accordingly, when environments where the motor is disposed have certain restrictions on the motor width, the coils cannot be wound in a number that effectively satisfies the motor rating. Furthermore, when the length of the motor in the axial direction is restricted, the coil volume is affected, and the torque characteristic is lowered.

To address the problem described above, a stepping motor in which magnetic pole pieces are not formed on yoke plates on both sides thereof in a specified diameteral direction is known. Notches are cut in the yoke cases along two parallel lines on both sides of the rotor, to thereby shorten the size in a specified direction. In this case, the reduction of the motor in size is attempted on condition that the diameter of the rotor and the number of coil windings should not be reduced. Therefore, if plane sections, which may correspond to chords of arcs, are cut to form the notches in the yoke cases while maintaining the air gaps without reducing the thickness of the coils, a plane of the rotor intersects the notches. Therefore, in order to reduce the size of the motor, the magnetic pole pieces inside the coils corresponding to the notches in the yoke cases need to be removed. In other words, in accordance with the motor described above, the coils are modified on the inside to thereby attempt to reduce the size on the outside.

However, because the magnetic pole pieces are not formed in the direction in which the sized is reduced, the magnetic field around the entire periphery of the rotor becomes irregular, which affects the motor characteristics including, for example, the frequency characteristic and torque characteristic.

SUMMARY OF THE INVENTION

It is an object of the present invention to provide motors including a stepping motor and a synchronous motor, in which the motor width in a specified direction is shortened, a uniform magnetic field is achieved around the entire periphery of the rotor, an effective number of coil windings can be secured, and a large torque is obtained with small current.

A motor in accordance with the present invention is equipped with a rotor equipped with a magnet, a stator yoke having claw poles with plural comb-teeth like pole teeth disposed opposing to one another and arranged in a cylindrical shape extending in an axial direction and around an outer periphery of the rotor in a circumferential direction, a bobbin formed from a coil wound around the stator yoke, and a cylindrical motor case that encircles the rotor, the stator yoke and the bobbin and formed from conductive material, wherein the motor case has side wall sections defining plane opening sections in areas opposing to portions of the bobbin, and an outer peripheral surface of the coil of the bobbin is protruded from the opening sections. As a result, the amount of coil windings is increased.

Also, an outer peripheral surface of the coil of the bobbin may be located in close proximity to the plane opening sections on the side walls of the motor case. Normally, the outer peripheral surface of the coil of the stator bobbin needs to be spaced a specified distance from an internal wall of the conductive motor case that defines the outer shape of the motor to secure an insulation gap, and therefore cannot be placed closer than the specified distance to the inner wall of the motor case. However, since portions of the side walls of the motor case are cut out, the motor becomes free of the problems relating to the insulation gap, and the winding section of the stator bobbin can be increased to an area in close proximity to the opening sections, where the side walls of the motor case occupied in the conventional motor structure.

Furthermore, the side wall sections of the motor case are provided with bent sections that are discontinuous in the circumferential direction and formed adjacent to edge sections of the plane opening sections. The bent structure in the side wall sections improves the rigidity in areas near the edge sections of the opening sections, whereby the precision of the motor structure can be readily maintained. As a result, the coil winding section can be placed closer to the cut sections, and may be protruded out of the motor case through the cut sections, such that the amount of coil winding can be increased. Furthermore, the motor case may be formed from magnetic material and also made to function as the stator yoke. As a result, common parts can be used for the motor case and the stator yoke, and therefore the number of parts can be reduced.

Other features and advantages of the invention will be apparent from the following detailed description, taken in conjunction with the accompanying drawings that illustrate, by way of example, various features of embodiments of the invention.

PREFERRED EMBODIMENTS

Figure 1:
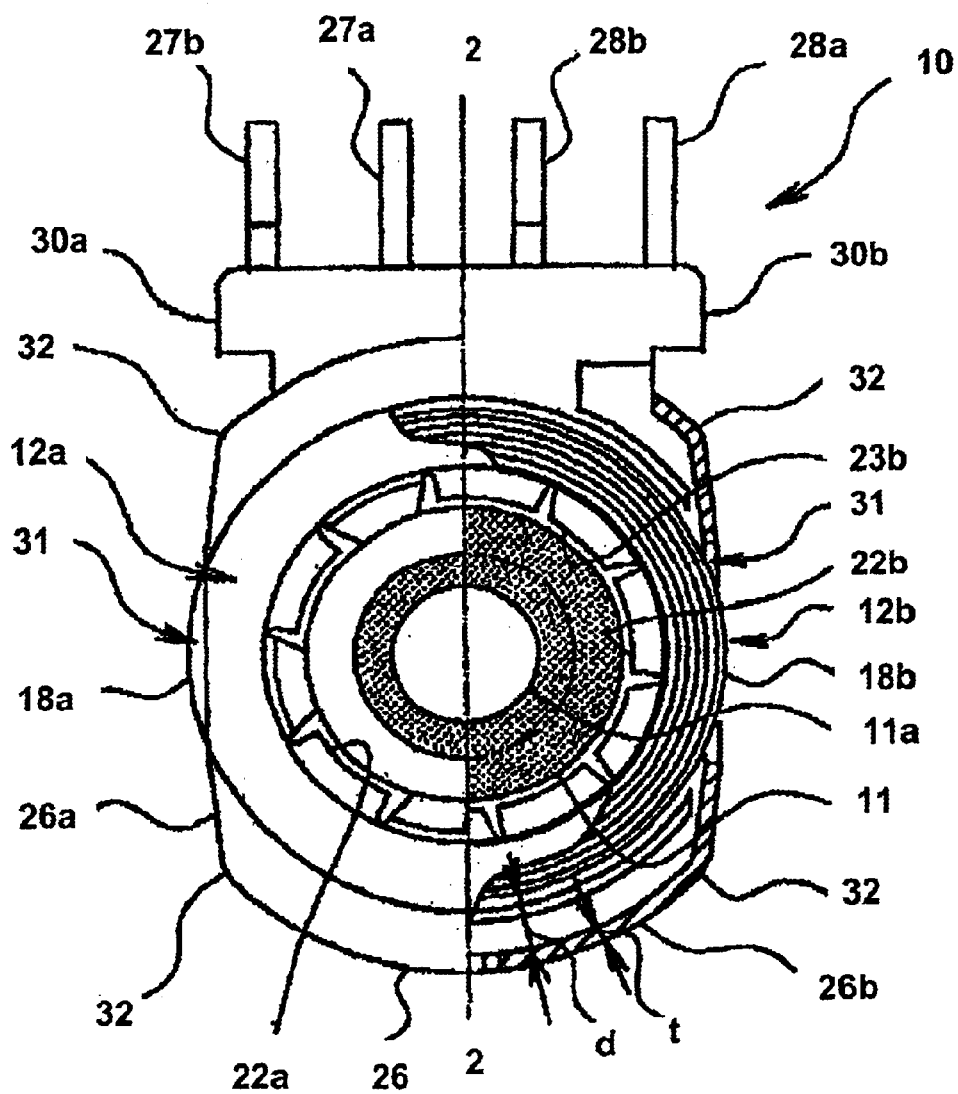
FIG. 1 is a front view of a motor in accordance with a first embodiment of the present invention as viewed in an axial direction with a portion partially cut.
Figure 2:
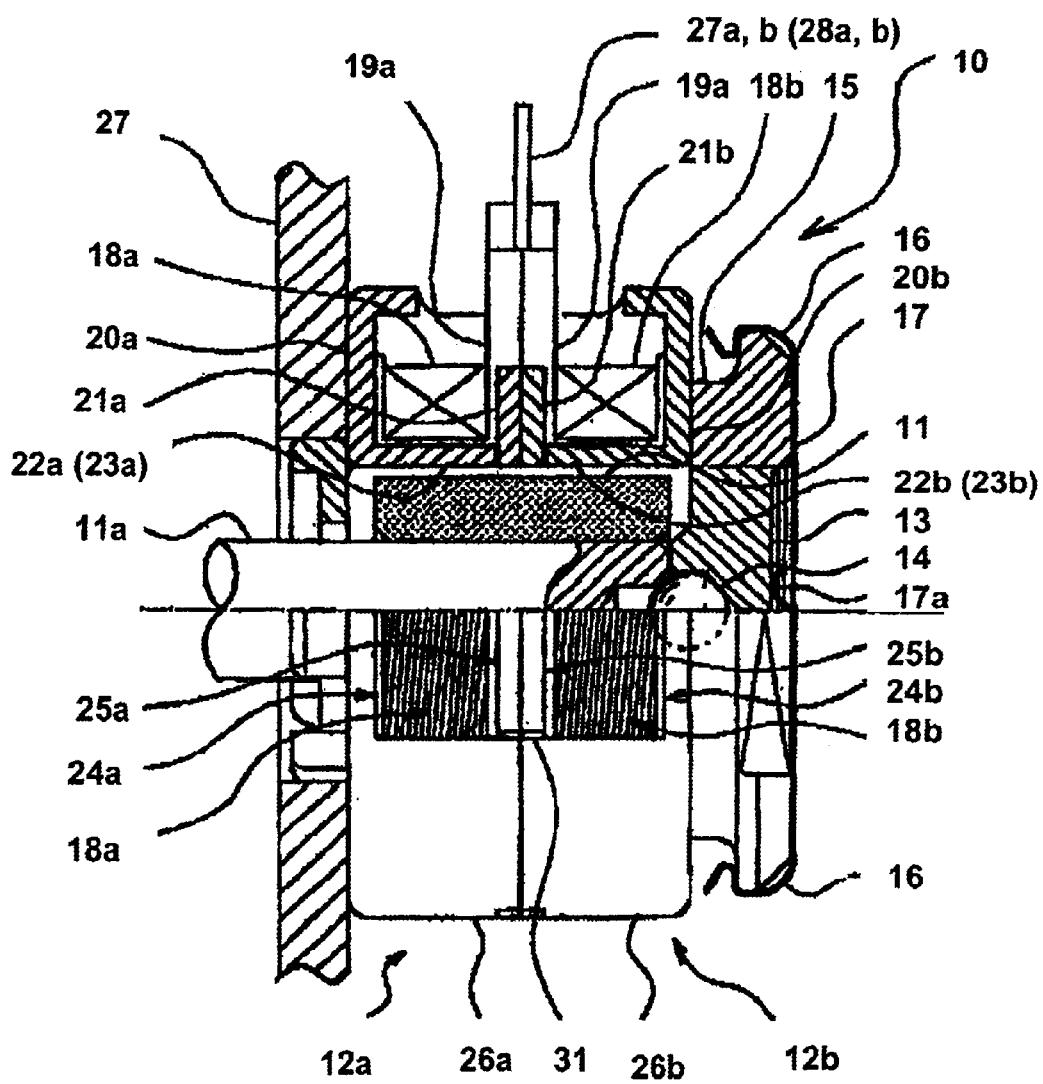
FIG. 2 is a side view of the motor with a cross-sectional view of an upper half section thereof taken along a line 2—2 of FIG. 1.
Figure 3:
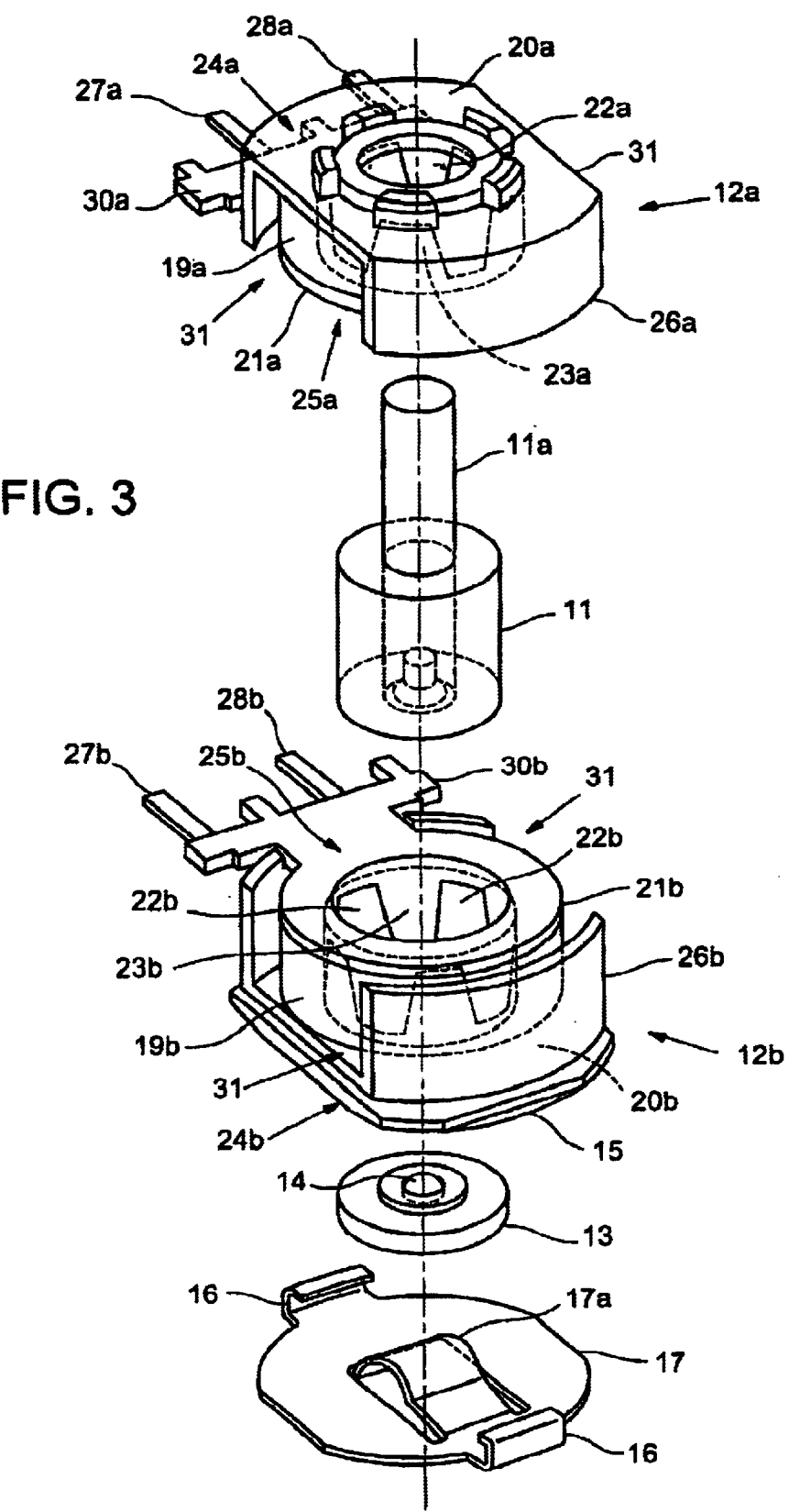
FIG. 3 is an exploded perspective view roughly showing the structure of the motor of the first embodiment shown in FIGS. 1 and 2.
Figure 4:
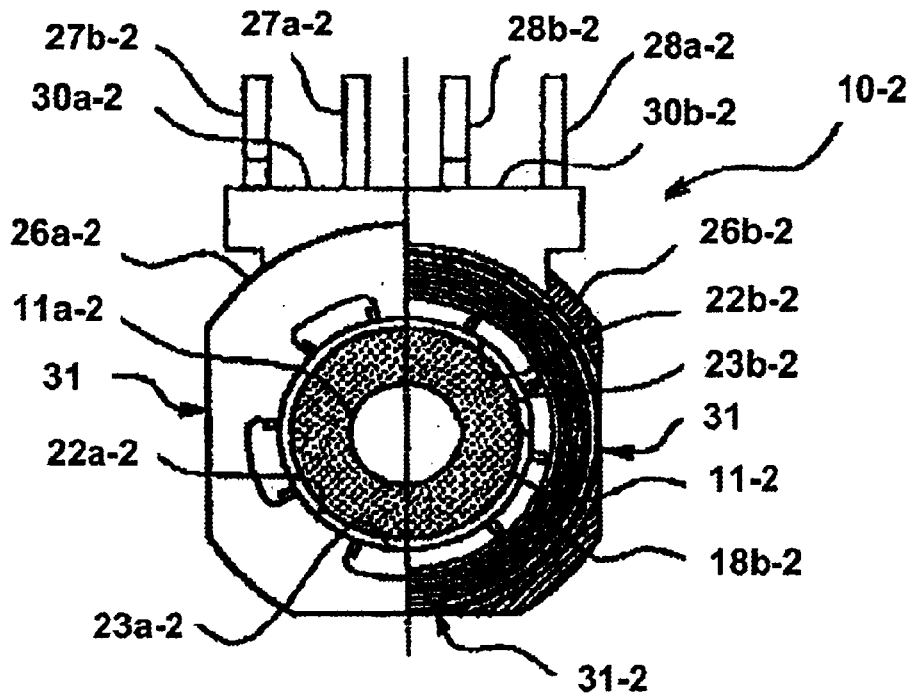
FIG. 4 is a front view of a motor in accordance with a second embodiment of the present invention with a cross-sectional view of a half section thereof.
Figure 5:
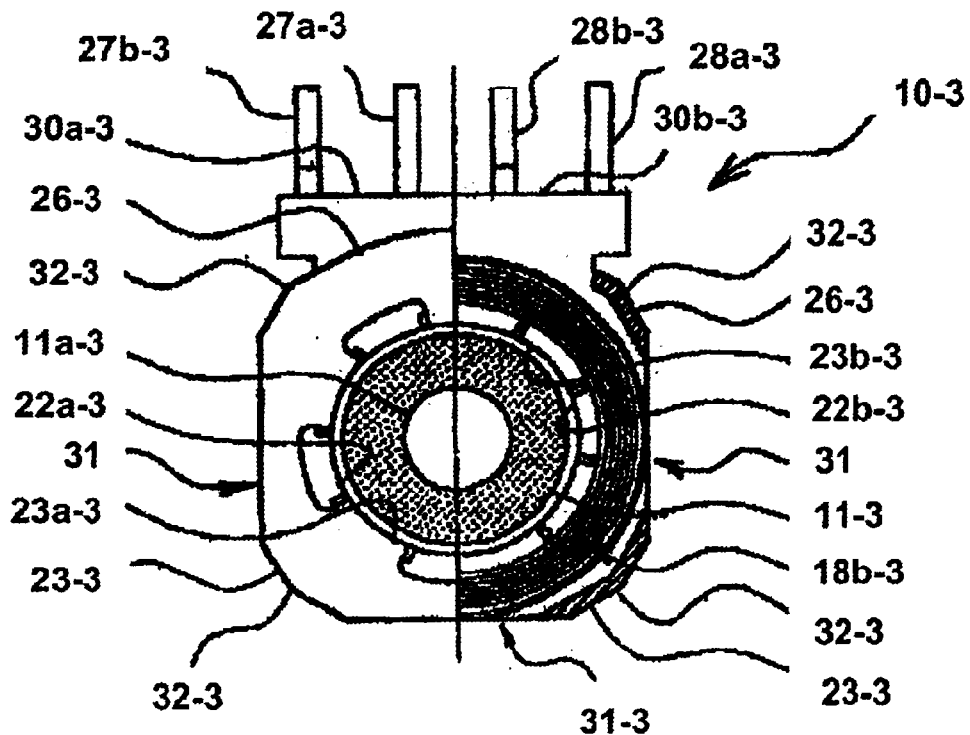
FIG. 5 is a front view of a motor in accordance with a third embodiment of the present invention with a cross-sectional view of a half section thereof.

Motors in accordance with preferred embodiments of the present invention will be described below with reference to the accompanying drawings. FIG. 1 is a front view of a PM (permanent magnet)-type stepping motor 10 in accordance with a first embodiment of the present invention as viewed in an axial direction with a portion partially cut. FIG. 2 is a side view of the motor 10 with a cross-sectional view of an upper half section thereof taken along a line 2—2 of FIG. 1. FIG. 3 is an exploded perspective view roughly showing the structure of the motor 1 of the first embodiment shown in FIGS. 1 and 2 for ready understanding of the structure of the motor 1. FIG. 4 is a front view of a motor in accordance with a second embodiment of the present invention with a cross-sectional view of a half section thereof. FIG. 5 is a front view of a motor in accordance with a third embodiment of the present invention with a cross-sectional view of a half section thereof. Components of the second and third embodiments in the figures, which are common to the components of the first embodiment, are indicated by the same reference numbers with additional numbers –2 or –3, respectively.

A rotor 11 is formed from a cylindrical magnet magnetized in multiple poles in which N-S poles in a specified number are arranged in a circumferential direction of a rotor shaft 11a. Stators 12a and 12b are formed from A-phase block and B-phase block, i.e., two independent blocks having a similar structure. The B-phase block 12b in the stepping motor 10 of the present embodiment is provided with a thrust bearing plate 13 and a steel ball 14 disposed at the center of the thrust bearing plate 13, which supports the rotor shaft 11a. A leaf spring 17 with S-shaped bent sections 16 is snap-fitted on a cap 15. The leaf spring 17 has a pressure section 17a that is a central portion cut out from the leaf spring 17. To allow the freedom of movements of the thrust bearing plate 13 in the axial direction within a predetermined range, the thrust bearing plate 13 is flexibly supported at an opposite side of a face where the steel ball 14 is mounted by the pressure section 17a in a manner moveable in the axial direction.

The stators 12a and 12b are formed from a bobbin 19a in which a A-phase coil 18a is wound, a bobbin 19b in which a B-phase coil 18b is wound, yoke plates 20a, 21a, 20b and 21b, and comb-shaped claw poles (pole teeth) of the same shape 22a, 23a, 22b and 23b that are cut out from the yoke plates and perpendicularly bent along an internal circular periphery about the rotor 11. The two claw poles 22a and 23a for A-phase and the two claw poles 22b and 23b for B-phase mutually extend in opposite directions and are alternately disposed, respectively. The claw poles 22a and 23a for A-phase and the two claw poles 22b and 23b for B-phase, the yoke plates 21a and 21b functioning as inner stator yokes 25a and 25b, the yoke plates 20a and 20b functioning as outer stator yokes, define stator yoke cases 26a and 26b, respectively.

The coil 18a for A-phase and the coil 18b for B-phase are stored in the two opposing stator yoke cases 26a and 26b, respectively. The coil 18a for A-phase is wound to encircle the rotor 11 along the claw poles 22a and 23a that are circularly disposed along the inner edges of the outer yoke plate 20a and the inner yoke plate 21a, and the coil 18b for B-phase is wound to encircle the rotor 11 along the claw poles 22b and 23b that are circularly disposed along the inner edges of the outer yoke plate 20b and the inner yoke plate 21b. The bobbin for A-phase 19a and the bobbin for B-phase 19b are supported by the stator yokes 26a and 25a, and 25b and 26b through bobbin flange sections 24a and 24b. The two stator yoke cases 26a and 26b, which house the rotor 11 together with the coils 18a and 18b, and include the inner stator yokes 25a and 25b, are mutually coupled to one another by an appropriate coupling device. Among the components described above, the yoke plate 20a on the A-phase side is affixed to a mounting plate 27 into one piece that is equipped with another bearing (not shown) for supporting another end of the rotor shaft 11a. In the first embodiment, the two stator yoke cases 26a and 26b function as a motor case and are formed from magnetic material.

Reference numerals 28a and 27a and reference numerals 28a and 27b denote internal terminals for the A-phase coil 18a and the B-phase coil 18b, respectively. At the terminals 28a and 27a, currents are switched in reverse directions to invert an A-phase excited state to a (–A)-phase excited state. On the other hand, at the terminals 28b and 27b, currents are switched in reverse directions to invert a B-phase excited state to a (–B)-phase excited state. The terminals 28a and 27a and the terminals 28b and 27b are provided with terminal bases 30a and 30b, respectively. Depending on the mounting environments, the terminal bases 30a and 30 may not be provided, and instead, the terminals 28a and 27a and the terminals 28b and 27b may be directly taken out as lead wires.

Portions of the stator yoke cases 26a and 26b in the first embodiment, which are generally in a cylindrical form, are cut out in mutually parallel planes, which may be in close proximity to or generally tangential to the outer diameter of the coils 18a and 18b to provide opening sections 31. The outer peripheral surface of the coils 18a and 18b may generally coincide with the parallel planes in which the opening sections 31 are defined. In the first embodiment, the stator yoke cases 26a and 26b have side wall sections that coincide with and extend in the mutually parallel planes, and the opening sections 31 are formed in the side wall sections. Accordingly, the side wall sections of the stator yoke cases 26a and 26b (in other words, the plane opening sections 31) may generally coincide with an outer peripheral surface of the coil of the bobbin. In other words, the side wall sections of the stator yoke cases 26a and 26b may be spaced from one another a distance that is generally equivalent to the diameter of the coils 18a and 18b. In one embodiment, the outer peripheral surface of the coils 18a and 18b may protrude outwardly from the parallel planes in which the opening sections 31 are defined. In other words, the side wall sections of the stator yoke cases 26a and 26b may be spaced from one another a distance that is shorter than the diameter of the coils 18a and 18b such that the outer peripheral surface of the coils 18a and 18b protrude outwardly from the parallel planes.

As a result, although the coils 18a and 18b are exposed, an air gap d between the external periphery of the coils 18a and 18b and the inner surface of the stator yoke cases 26a and 26b and the wall thickness t are removed, such that the motor width can be reduced in the radial direction by a value equivalent to 2(d+t) compared to conventional motors having the same output characteristics, or the amount of coil windings can be increased accordingly (see FIG. 1).

The opening sections 31 of the motor 10 in the first embodiment are provided in planes parallel with an axial direction of the terminal bases 30a and 30b that are provided along the direction in which the terminals 28a and 27a and the terminals 28b and 27b are taken out. It is noted that, although the openings 31 may be modified depending on configurations of areas where the motor is mounted, the motor characteristic would not be affected by such a modification. FIGS. 4 and 5 show motors 10-2 and 10-3 in accordance with a second embodiment and a third embodiment of the present invention, respectively. In addition to the opening sections 31 provided in the first embodiment, portions of each of the motor cases are cut in planes perpendicular to the planes where the opening sections 31 are provided to form opening sections 31-2 and 31-3. As a result, the motor width is reduced in the axial direction of the terminal bases 30a and 30b.

Furthermore, the stator yoke cases 26a and 26b may be provided with bent sections 32 that are discontinuous in the peripheral direction and adjacent to the opening sections 31 to improve the structural strength of the stator yoke cases. In the motor 10-3 of the third embodiment shown in FIG. 5, bent sections 32-3 are formed in four remaining sections in the yoke cases as four corners. The PM-type stepping motor 10 in accordance with one embodiment of the present invention is described above as an example of motors of embodiments of the present invention. Operations and driving circuits for this motor are known and therefore description thereof is omitted.

The present invention is not limited to the PM (permanent magnetic) type stepping motor of the embodiment of the present invention described above. The present invention is applicable to hybrid type (HB type) motors (which use permanent magnets and variable reactance) and variable reactance type (VR type) motors within the scope of the subject matter of the present invention. For example, in structures in which lead wires are taken out without using terminal bases, planes of the motor cases in which opening sections are provided may be formed in any one of various shapes including an equilateral triangle column, a square column, an irregular column and the like, and a variety of other modifications and restructuring can be made.

In accordance with the present invention, a motor having an exterior motor housing with side walls is provided with opening sections in the side walls to thereby reduce the motor width, and a coil winding can be formed to a position that coincides with the external configuration of the motor. As a result, the volume of coil windings increases, the motor performances such as torque and stepping accuracy are improved, and the power consumption can be reduced because the winding resistance can be set much higher than those of the conventional types. Also, since the coil diameter can be increased, the size in the longitudinal direction of the motor can be shortened. For example, the size in the radial direction of the motor can be reduced by 16%, and the size in the longitudinal direction can be reduced by 36%–47%, compared to conventional motors with the same torque.

Furthermore, side walls of the motor cases are provided with bent sections to form a structural body, whereby the structural strength of the motor cases is improved. In addition, the motor case is formed from magnetic material, and is commonly used as a yoke. Accordingly, parts can be commonly used for the motor case and the yoke, and therefore the number of parts can be reduced, and the cost can be lowered.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a rotor equipped with a magnet;
   a stator yoke having claw poles generally in a comb shape disposed opposing to one another and arranged in a cylindrical shape extending in an axial direction and around an outer periphery of the rotor in a circumferential direction;
   a bobbin formed from a coil wound around the stator yoke; and
   a cylindrical motor case that houses the rotor, the stator yoke and the bobbin, the cylindrical motor case being formed from conductive material, wherein the motor case has side wall sections defining plane opening sections in areas opposing to portions of the bobbin, and an outer peripheral surface of the bobbin is located in close proximity to the opening sections, wherein at least one of the plane opening sections are parallel with an axial direction of terminal bases that are provided along the direction in which terminals are taken out of the motor case.

2. A motor according to claim 1, wherein the side wall sections of the motor case have bent sections that are discontinuous in the circumferential direction and formed adjacent to edge sections of the opening sections.

3. A motor according to claim 1, wherein the motor case is formed from magnetic material and also functions as a part of the stator yoke.

4. A motor according to claim 1, wherein the stator yoke is formed from a A-phase block and a B-phase block.

5. A motor comprising:
   a rotor equipped with a magnet;
   a stator yoke having claw poles generally in a comb shape disposed opposing to one another and arranged in a cylindrical shape extending in an axial direction and around an outer periphery of the rotor in a circumferential direction;
   a bobbin formed from a coil wound around the stator yoke; and
   a cylindrical motor case that encircles the rotor, the stator yoke and the bobbin, the cylindrical motor case being formed from conductive material, wherein the motor case has side wall sections defining plane opening sections in areas opposing to portions of the bobbin, and a part of an outer peripheral surface of the coil of the bobbin protrudes from the opening sections, wherein at least one of the plane opening sections are parallel with an axial direction of terminal bases that are provided along the direction in which terminals are taken out of the motor case.

6. A motor according to claim 5, wherein the side wall sections of the motor case generally coincide with mutually parallel planes tangential to an outer periphery of the coil of the bobbin.

7. A motor according to claim 5, wherein the motor case is formed from magnetic material and also functions as a part of the stator yoke.

8. A motor according to claim 5, wherein the stator yoke is formed from a A-phase block and a B-phase block.

9. A motor comprising:
   a rotor equipped with a cylindrical magnet magnetized in multiple poles;
   first and second stator yokes, each of the first and second stator yokes having two sets of claw poles disposed opposing to one another and arranged in a cylindrical shape extending in an axial direction and around an outer periphery of the rotor in a circumferential direction of the rotor;

first and second bobbins, each of the first and second bobbins formed from a coil wound around each of the first and second stator yokes, respectively; and first and second motor cases being formed from conductive material and coupled to one another, the first and second motor cases housing the rotor, the first and second stator yokes and the first and second bobbins, wherein the first and second motor cases define generally parallel planes in close proximity to an outer periphery of the coils of the first and second bobbins, and have side wall sections extending in close proximity to the parallel planes and defining opening sections, and the outer periphery of the coils of the first and second bobbins is located in close proximity to the parallel planes that define the opening sections, wherein at least one of the opening sections are parallel with an axial direction of terminal bases that are provided along the direction in which terminals are taken out of the motor cases.

10. A motor according to claim 9, wherein the generally parallel planes of the first and second motor cases are generally tangential to the outer periphery of the coils of the first and second bobbins.

11. A motor comprising:

a rotor equipped with a magnet;

a stator yoke having claw poles generally in a comb shape disposed opposing to one another an arranged in a cylindrical shape extending in an axial direction and around an outer periphery of the rotor in a circumferential direction;

a bobbin formed from a coil wound around the stator yoke; and a cylindricalm motor case that houses the rotor, the stator yoke and the bobbin, the cylindrical motor case being formed from conductive material, wherein the motor case has side wall sections defining plane opening sections in areas opposing to portions of the bobbin, the side wall sections having bent sections that are discontinuous in the circumferential direction and formed adjacent to edge section of the opening sections, and an outer peripheral surface of the coil of the bobbin is located in close proximity to the opening sections.

12. A motor according to claim 11, wherein the motor case is formed from magnetic material and also functions as a part of the stator yoke.

13. A motor according to claim 11, wherein the stator yoke is formed from a A-phase block and a B-phase block.

* * * * *